United States Patent [19]
Kashiyama et al.

[11] 3,928,519
[45] Dec. 23, 1975

[54] METHOD FOR FORMING ON AN ELONGATED CORE MEMBER A COVERING OF THERMOPLASTIC MATERIAL BY EXTRUSION

[75] Inventors: Hiroshi Kashiyama; Susumu Tobita, both of Ichihara, Japan

[73] Assignee: The Furukawa Electric Co., Ltd., Tokyo, Japan

[22] Filed: July 25, 1973

[21] Appl. No.: 382,347

[30] Foreign Application Priority Data
July 29, 1972  Japan.............................. 47-75552
Feb. 7, 1973   Japan.............................. 48-14622
Apr. 4, 1973   Japan.............................. 48-37850
Feb. 14, 1973  Japan.............................. 48-18708

[52] U.S. Cl................... 264/40; 29/624; 156/47.51; 174/105; 174/106; 174/107; 264/167; 264/174; 264/177 R; 428/379; 428/399
[51] Int. Cl.²...................... B29F 3/10; D01D 13/06
[58] Field of Search ........... 173/244, 109, 106, 107; 425/114, 113, 132; 264/167, 174, 96, 40, 264/177 R; 29/624; 156/47.51; 161/179; 174/105-107; 428/379, 399

[56] References Cited
UNITED STATES PATENTS
1,689,312  10/1928  Williams............................ 264/174
2,264,415  12/1941  Taylor et al. ...................... 264/168
2,593,469   4/1952  Mason ............................... 264/167
2,897,542   8/1959  Isenberg............................ 425/113
3,180,910   4/1965  Buhmann............................ 264/174
3,280,847  10/1966  Chisholm et al................... 425/113
3,382,122   5/1968  Nalle.................................. 425/113
3,399,262   8/1968  Quackenbush et al. ............ 264/209
3,422,648   1/1969  Lemelson........................... 425/113
3,557,403   1/1971  Lemelson........................... 425/113
3,685,147   8/1972  Nevin et al....................... 264/177 R
3,710,440   1/1973  Nevin et al. ........................ 29/624

Primary Examiner—Jay H. Woo
Attorney, Agent, or Firm—Woodling, Krost, Granger & Rust

[57] ABSTRACT

This invention relates to a method for forming on an outer periphery of an elongated core member, a covering layer of thermoplastic material by extrusion, said covering layer including outwardly and diametrically extending enlarged portions thereon equally spaced from each other along the longitudinal axis of said covering, comprising the step of feeding said core member at a periodically varied velocity thereof through an extruder having a substantially constant volumetric flow of said thermoplastic material. Furthermore, this invention relates to a method for producing an insulated core member for a coaxial cable comprising the step of extruding on an elongated inner conductor an insulation of thermoplastic material with an enlarged portion and a reduced portion alternately provided thereon. Furthermore, this invention relates to a method for producing an electric wire free from growth of snow collecting thereon, said electric wire comprising a covering layer formed thereon by extrusion, said covering layer provided with longitudinal rib or ribs and a plurality of peripheral ribs spaced from each other along the longitudinal axis of said electric wire.

7 Claims, 32 Drawing Figures

$v = 4 + 10 \sin \omega t$  $\omega = 3142$ rad/min.
$f = 8.33$ c.p.s.
average velocity of a wire member 4 m/min.

$\tau_0 = 0.0408$ sec.
$\tau_1 = 0.1540$ sec.
average velocity of a wire member 4 m/min.

METHOD FOR FORMING ON AN ELONGATED CORE MEMBER A COVERING OF THERMOPLASTIC MATERIAL BY EXTRUSION

FIELD OF THE INVENTION

This invention generally pertains to a method and an apparatus for extruding a covering layer of thermoplastic material on an elongated core member which may be in the form of wire, strip and the like, such as an electric conductor, a communicating cable core, rope, strand or the likes, and more particularly to a method and an apparatus for extruding on an elongated core member a covering layer with an outwardly and diametrically extending portions provided longitudinally in a properly spaced relation to each other.

BACKGROUND OF THE INVENTION

In various fields, a covering of thermoplastic material is required to be provided on an elongated core member in the form of wire, strip or the like and in such cases to include a plurality of peripheral enlarged portions provided in a longitudinally and equally spaced relation to each other. In the manufacture of power distribution cables, for example, in order to prevent snow on a cable from growing into an enlarged lump due to its displacement along the axis thereof, there are provided a plurality of peripheral enlarged portions or rings longitudinally spaced from each other. In the field of fishing net manufacture, there is required an edge rope with a plurality of peripheral ribs provided thereon and longitudinally spaced from each other whereby the ribs on the rope can prevent threads latched on the rope from displacing along the longitudinal axis of the rope.

In one of some fields, such peripheral enlarged portions on the elongated core member have been provided by forcing inwardly and diametrically or squeezing the covering on the core member in a longitudinally spaced manner after its extrusion and prior to its cooling and solidification. However, the disadvantage of such process is that it does not permit the feeding of the core member at a higher speed through an extruder. In another field, the enlarged portions on the extruded covering have been formed by cutting the covering circumferentially so as to reduce its outer diameter in a longitudinally spaced manner, but it advantageously requires substantial time for cutting. The procedure has been commonly used in which a length of tape is wound around the extruded covering on the core member in a uniform thickness. However, this procedure requires the step of cutting an elongated tape into the predetermined lengths, which will be manually operated or effected by a complicate installation with the result that the products will become expensive.

In various fields, such as manufactures of ski sticks or fishing rods are used non-slippery handle grips, with uneven surfaces conventionally formed by injection because it cannot be extruded. If a covering with a plurality of annular projections spaced longitudinally from each other will be able to be extruded on a core member in the form of a tubular base of a handle grip, a plurality of handle grips will be produced by cutting the elongated tubular base with the extruded covering into predetermined lengths.

Furthermore, it will be mostly intended by the inventors that in field of the manufacture of a coaxial cable for communication, an insulation of any type is provided around an inner conductor of the coaxial cable to space it from an outer conductor thereof. By way of example, there is commonly used a coaxial cable, the inner conductor of which has a plurality of insulating disks spaced longitudinally from each other. However, mounting the disks on the inner conductor is considerably troublesome, poor in efficiency and unsuitable for mass production by continuous operation. The conventional coaxial cable which comprises the insulating disks on the inner conductor has some disadvantages one of which is that in case the outer conductor is compressed by external force, it contacts with the inner conductor due to its exposure causing short-circuit. Another disadvantage is that in case water enters the cable through the outer conductor it will unpreferably pass along the longitudinal axis of the cable between the outer conductor and the outer edges of the disks on the inner conductor to cause insulation resistance to be reduced between the outer and inner conductors over the substantial length thereof. Therefore, the inner conductor is desired to have an insulating covering layer over the entire length thereof and on the other hand it is required to have a vacant space free of solid insulation while a spaced relation can be maintained between the outer and inner conductors because the cable is required to have an equivalent specific dielectric constant as lower as possible. Thus, it is desirable that the coaxial cable may have a thin insulating covering layer over the entire length thereof with a plurality of longitudinally spaced annular projections or disks provided on the covering layer. But, with the prior art extruding process it is impossible to make such covering layer with the above-mentioned disks.

OBJECT OF THE INVENTION

Accordingly, it is a principal object of the present invention to provide a method for extruding on an elongated core member of any cross section a covering of thermoplastic material with a plurality of largely diametered projections spaced longitudinally from each other.

It is another object of the present invention to provide a method for extruding a covering of thermoplastic material with a plurality of projections on an elongated core member, with the configuration of the projections and their precision upon manufacturing adapted to be controlled as desired.

It is further object of the present invention to provide an apparatus adapted to practise a method for extruding the afore-mentioned covering on an elongated core member.

It is further object of the present invention to provide a method for producing an insulated core for a coaxial cable by means of application of the method described in the first-mentioned object.

It is another object of the present invention to provide a method for producing an electric wire free from growth of snow thereon by means of application of the method described in the first-mentioned object.

SUMMARY OF THE INVENTION

In accordance with one aspect of the present invention, there is provided a method for forming on an elongated core member a covering of thermoplastic material with the outer diameter thereof varied longitudinally, comprising the steps of extruding said thermoplastic material on said core member through an extruder, at constant volumetric flow rate of said thermoplastic material and feeding said core member through said extruder with its feeding velocity pulsatingly varied.

In accordance with another aspect of the present invention, there is provided an apparatus for extruding on an elongated core member a covering of thermoplastic material with the outer diameter longitudinally varied, comprising supply means to supply said elongated core member in a continuous manner, an extruder to extrude said thermoplastic material on said core member therethrough at a constant volumetric flow rate of said thermoplastic material and means to feed said core member through said extruder adjacent to the die thereof at pulsatingly varied feeding velocities of said core member, said feeding means including a constant feeder to feed said core member from said supply means at a constant velocity of said core member and a modulator to modulate the feeding velocity of said core member from said feeder whereby said covering will be formed on said core member with the outer diameter of said covering varied along the longitudinal axis thereof.

In accordance with another aspect of the present invention, there is provided a method for producing an insulated core for a coaxial cable, said insulated core including an elongated inner conductor and a thin insulating covering of thermoplastic material with a plurality of enlarged portions spaced longitudinally from each other, comprising the step of passing said inner conductor at a feeding velocity thereof periodically varied through an extruder die having a constant volumetric flow rate of said thermoplastic material therethrough, said feeding velocity of said inner conductor having maximum value more than the average flow rate of said thermoplastic material through said extruder die and having minimum value which is negative.

In accordance with another aspect of the present invention, there is provided a method for producing an electric wire free from growth of snow collecting thereon, said wire comprising a core conductor and an insulator of thermoplastic material provided on said core conductor, including a plurality of peripheral ribs spaced longitudinally from each other and longitudinal rib means, comprising the step of passing said core conductor at periodically varied feeding velocities through an extruder die having a constant volumetric flow rate of said thermoplastic material, said extruder die having longitudinal groove means in the inner periphery of the die adjacent to the outlet thereof to thereby form said longitudinal rib means.

BRIEF DESCRIPTION OF THE DRAWINGS

The above-mentioned and other objects and features of the present invention will become apparent to those skilled in the art from the following description of some preferred embodiments with reference to the accompanying drawings.

DETAILED DESCRIPTION OF PREFERRED EMBODIMENTS

Figure 1:
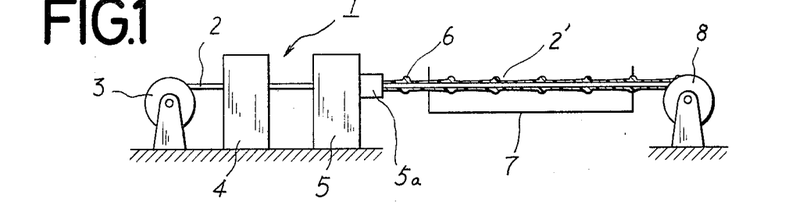
FIG. 1 is a schematic diagram of a system for extruding thermoplastic material on an elongated core member in accordance with the principle of the present invention.

Referring now to FIG. 1, a system embodying the principle of the present invention is indicated generally at numeral 1 and in this system wire member 2, one example of an elongated core member is drawn out of a supply source 3 in which coiled wire member is contained and fed through pulsatingly feeding means 4 into an extruder 5 wherein a covering 6 is extruded on the wire member 2 to provide a covered wire member 2' which in turn passes through a cooling trough 7 for its solidification and then is wound by a coiler 8. Pulsatingly feeding means 4, as described hereinafter, includes a constant feeder to feed the wire member 2 from the supply source 3 at a constant feeding velocity thereof and a modulator to modulate the feeding velocity of that portion of the wire member which passes through a die 5a of the extruder 5 to provide a pulsatingly varied feeding velocity of the wire member 2.

Generally, in an extruder having a conventional cross head, such as an extruder for covering a conductor of an electric cable, provision of higher pressure of melted material by a driven screw within the cross head causes a volumetric flow rate of the melted material to become substantially constant even though covering rate of the wire member, that is feeding velocity of the wire member through the extruder would vary. This fact has been assured by some tests in connection with this respect. With such volumetric flow rate of melted material maintained at constant value, an amount of plastic material attached to the wire member varies with the feeding velocity of the wire member through the extruder and as a result when the feeding velocity of the wire member is relatively higher, an amount of attached material to the wire member per unit cross sectional area thereof is smaller enough to apply a relatively thinner covering 6 on the wire member while an amount of attached material per unit cross sectional area is greater enough to apply a relatively thicker covering to the wire member when the feeding velocity of the same is relatively smaller. Thus, the periodically varied feeding velocity of the wire member 2 through the extruder 5 by the modulator of pulsatingly feeding means 4 causes the thickness of the covering 6 on the wire member to vary along the longitudinal axis thereof to provide a corrugated outer surface of the covering 6 which as a result has the outer diameter varied along the longitudinal axis thereof.

It should be noted that it is important for effectiveness in varied outer diameters of the covering 6 to consider the average flow rate of thermoplastic material in the die of the extruder adjacent to the outlet thereof relative to the feeding velocity of the wire member through the extruder. More particularly, the pulsating variation in the feeding velocity of the wire member 2 may be effected by alternately repeating the feeding velocities of the wire member greater and less than the average flow rate of thermoplastic material through the die adjacent to the outlet thereof. Thermoplastic material through the die has first flow portion adjacent to the inner periphery of the die, second flow portion adjacent to the wire member and third flow portion between the first and second flow portions, all of which have different flow rates thereof, respectively. Accordingly, "the average flow rate of thermoplastic material through the die adjacent to the outlet thereof" is referred hereinafter to the average value of the flow rates of all the flow portions through the cross section of the die outlet. The average flow rate can be determined by the cross sectional area of the die outlet of the extruder and the volumetric flow rate of thermoplastic material therethrough.

It will be understood that variation in the outer diameter of the covering 6 along the longitudinal axis thereof depends upon parameters, such as the average feeding velocity of the wire member, wave form of the velocity, the maximum and minimum velocities, variation pitch of the velocity (cycle) etc., which are determined by the particular pulsatingly feeding means.

Figure 2:
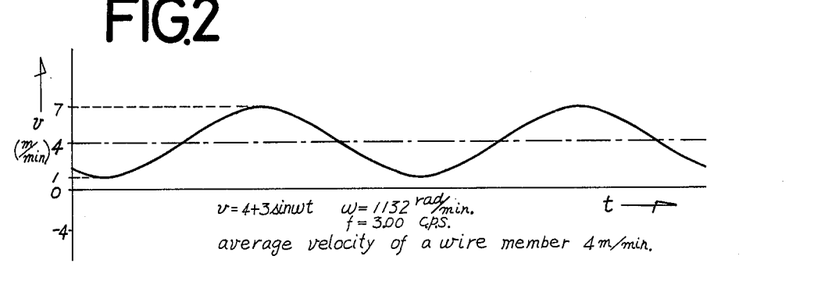
FIGS. 2, 4, 6 and 8 are graphs illustrating different characteristics respectively, in which feeding velocity of the elongated core member through an extruder die varies with time.
Figure 3:
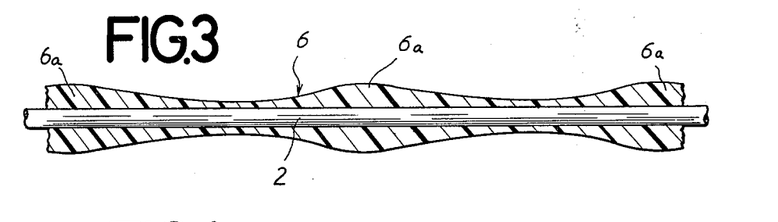
FIGS. 3, 5, 7 and 9 are enlarged side views of the elongated core members covered with thermoplastic material in use of characteristics shown in FIGS. 2, 4, 6 and 8, respectively.

FIG. 2 shows one of the characteristics in which the feeding velocity of the wire member $v$ varies with time $t$ and the characteristic shown in this figure is generally in the form of sine wave wherein its amplitude is smaller and variation pitch or cycle is larger. It will be found that the minimum feeding velocity is positive. FIG. 3 illustrates the covering 6 of thermoplastic material applied on the wire member 2 in accordance with the characteristic as shown in FIG. 2. It will be found that the covering 6 has moderate variation in its outer diameter and therefore, the wire member 2 has nodular portions 6a of the covering spaced along the longitudinal axis thereof from each other.

Figure 4:
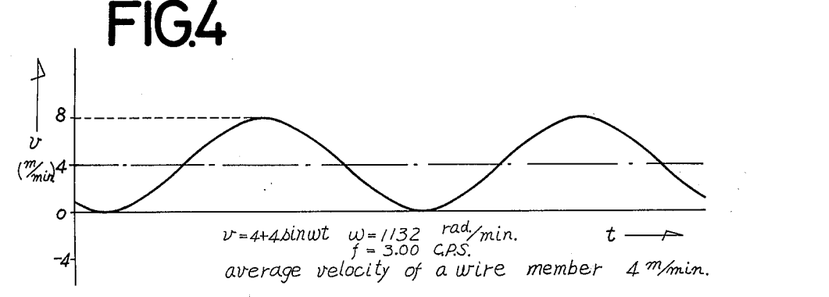
Figure 5:
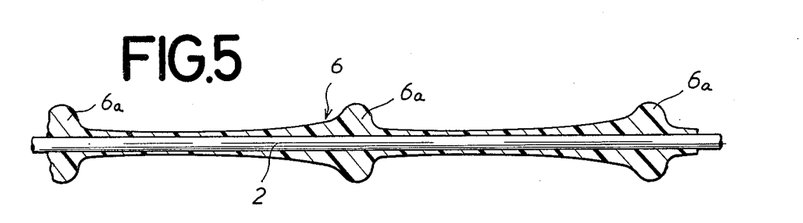

FIG. 4 shows another characteristic of the feeding velocity of the wire member $v$ relative to time $t$, which is also generally in the form of sine wave, but somewhat larger in its amplitude than that of FIG. 2 and shown to have the minimum feeding velocity of zero. FIG. 5 illustrates the covering 6 of thermoplastic material applied on the wire member 2 in accordance with the characteristic as shown in FIG. 4. It will be found that the covering 6 of FIG. 5 has relatively larger variation in the outer diameter of nodular portions 6a which are formed at the moment at which the wire member 2 temporally stops to be fed.

Figure 6:
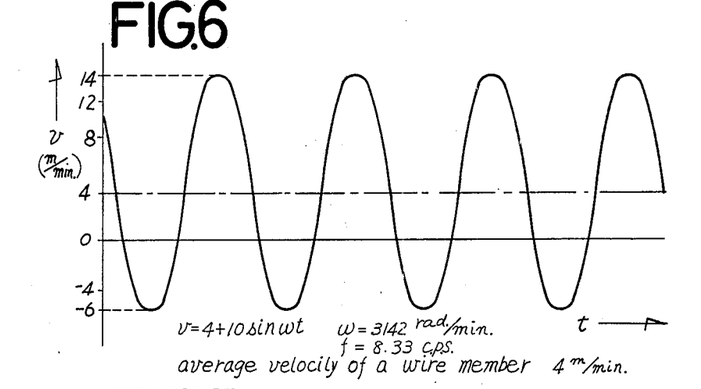
Figure 7:
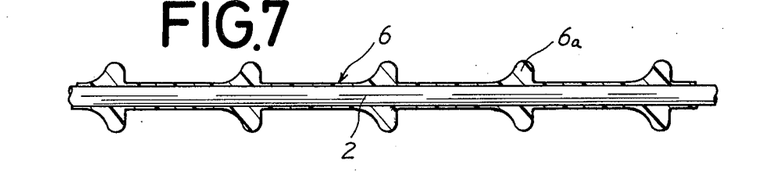

FIG. 6 shows another characteristic of the feeding velocity of the wire member $v$ relative to time $t$, which is also generally in the form of sine wave, but somewhat larger in its amplitude and smaller in its variation pitch than that of FIG. 2. It should be noted that it has the negative minimum velocity of the wire member. Thus, the wire member 2 results to repeat relatively larger forward movement and relatively smaller backward movement within the die of the extruder. FIG. 7 illustrates in configuration the covering 6 of thermoplastic material applied on the wire member 2 in accordance with the characteristic as shown in FIG. 6. It will be noted that the covering of FIG. 7 has acute variation in diametrically enlarged portions 6a because of thermoplastic material on the wire member 2 stopping at the front of the die 5a due to the wire member's backward movement. Thus, it will be appreciated that if there occurs such backward movement of the wire member 2, then the front configuration of the die 5a may determine that of the diametrically enlarged portions 6a of the covering 6 on the wire member, which will be hereinafter described in more detail with reference to FIGS. 15 through 23.

Figure 8:
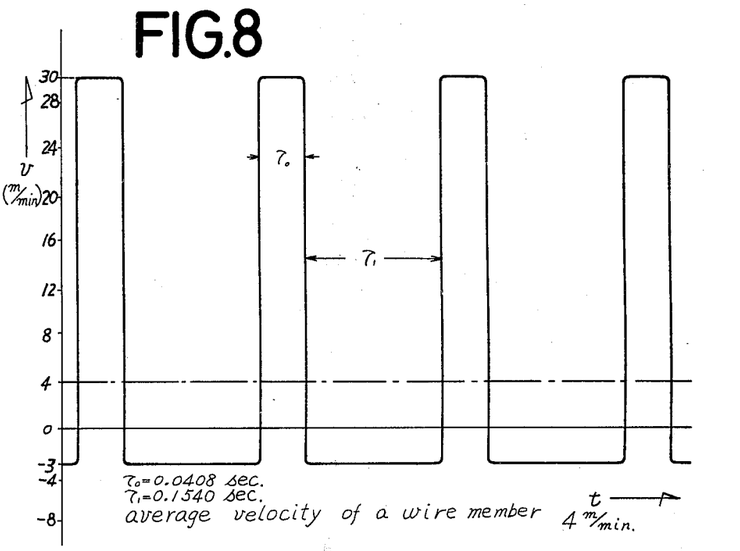
Figure 9:
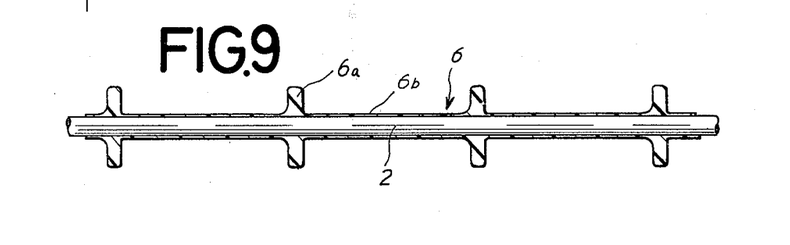

The characteristic of the feeding velocity of the wire member $v$ relative to time $t$, as shown in FIG. 8 is in the form of square wave and has the negative minimum feeding velocity of the wire member which means that the wire member 2 will make backward movement during a period of time. FIG. 9 illustrates in configuration the covering 6 extruded on the wire member 2 in accordance with the characteristic shown in FIG. 8. It will be noted that the covering of FIG. 9 has vertically raised variation in diametrically enlarged portions 6a because of acute variation in the feeding velocity of the wire member 2 and that diametrically reduced portions 6b of the covering 6 are thinner because of the maximum feeding velocity of the wire member considerably greater than those of FIGS. 2, 4 and 6.

As described hereinabove, the elongated core member to be covered with thermoplastic material may be of any cross section, such as wire, strip, tube and the likes. It may be a body with a longitudinal rib or ribs provided thereon so as to hold the covering on the core member from peripheral displacement relative to one another. Alternatively, it may be provided with properly spaced projections or indentations to prevent the covering on the core member from longitudinal displacement relative to the latter. Such projections or indentations may be made by embossing or pressing portions of tubular core member, for example. Strands, ropes, fibres and the likes have cross section varied along the longitudinal axis thereof, which can apply the present invention thereto. It will be understood that the aforesaid core members should be of sufficient resistance to withstand the melting point of thermoplastic material when it is extruded on them. Material of the core member is dependent upon material of the covering and vice versa. Thermoplastic material used as covering may include organic material, such as polymer, for example, inorganic material such as glass, for example and metallic material. The cross section of the covering, which may be circular, elliptical, rectangular and of any other type, may depend upon the cross section of the core member, but it may be preferably controlled by the cross section of the extruder die 5a, as above-described and described hereinafter in more detail.

Referring now to FIGS. 10 to 13, there is shown an embodiment of pulsatingly feeding means 4 for the wire member suitable for practising the method in accordance with the present invention, which means is illustrated to comprise a frame assembly 9 constructed of shape steels, on which a constant feeder section 10 and a modulator section 11 are mounted.

Figure 10:
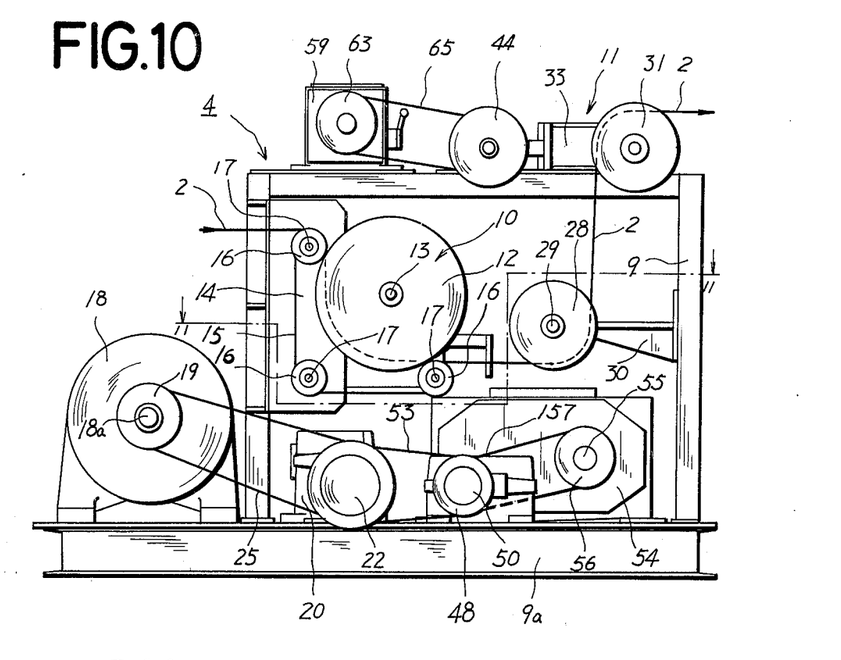
FIG. 10 is a side elevational view of one embodiment of pulsatingly feeding means in the system illustrated in FIG. 1.

The feeder section 10 may comprise a metallic pulley 12 securely mounted on a shaft 13 which is in turn journalled on a base 14 by any conventional means. The feeder section also comprises an endless rubber belt 15 frictionally engaging the pulley 12 at the substantially half portion thereof, which belt is shown to engage and pass around three pulleys 16 which are in turn journalled on the base 14 by means of respective shafts 17.

An electric motor 18 may be mounted on the base portion 9a of the frame assembly 9, which motor has a pulley 19 secured to the output shaft 18a thereof. On the base portion 9a is mounted a first reduction gear 20 including on one of the sides thereof an input shaft 21 having a duplex grooved pulley 22 secured thereto and on the other side thereof an output shaft 23 having a sprocket 24 secured thereto. An endless belt 25 is wound between the pulley 19 on the motor output shaft 18a and the pulley 22 on the reduction gear input shaft 21 at one of the grooves 22a thereof and therefore, the reduction gear may be driven by the motor 18. On the shaft 13 having the pulley 12 secured thereto is mounted in the common vertical plane to the pulley 24 a sprocket 26 which is not shown in FIG. 10 to be operatively associated with the pulley 12 for clarification of the illustration. An endless chain 27 engages sprockets 24 and 26 therebetween and it will be appreciated that the pulley 12 of the feeder section 10 can be driven by the output of the first reduction gear 20.

Since the wire member 2 from the supply source 3 shown in FIG. 1 passes through the feeder section 10 with the wire member forcedly held between the pulley 12 and the endless rubber belt 15, the wire member results to be fed at constant velocity depending upon the circumferential speed of the pulley 12. It will be noted that the constant feeder section 10 may be alternatively of any other conventional form. The feeder section 10 serves to determine the average feeding velocity of the wire member 2 and in addition to have no effect on the supply source 3 from periodical variation in tension exerted on the wire member 2 upon pulsatory movement thereof by means of the modulator section 11 which will be described herein-just below.

The modulator section 11 may preferably comprise a metallic guide pulley 28 having a shaft 29 secured thereto and journalled on a bracket 30 by any conventional means, which may be secured to the frame assembly 9 as by means of welding, and a metallic oscillating pulley 31 which will be described herein-just below. The oscillating pulley 31 may be rotatably supported on a reciprocating rod 32 at one of the ends thereof, which moves while guided by a guide assembly 33 which may be in turn mounted on the frame assembly 9 as described hereinafter. The wire member 2 from the feeder section 10 passes around the guide pulley 28 at half portion thereof and then around the oscillating pulley 31 at half portion thereof in the direction indicated by an arrow of FIG. 10, after which it is fed into the extruder 5 shown in FIG. 1.

Figure 13:
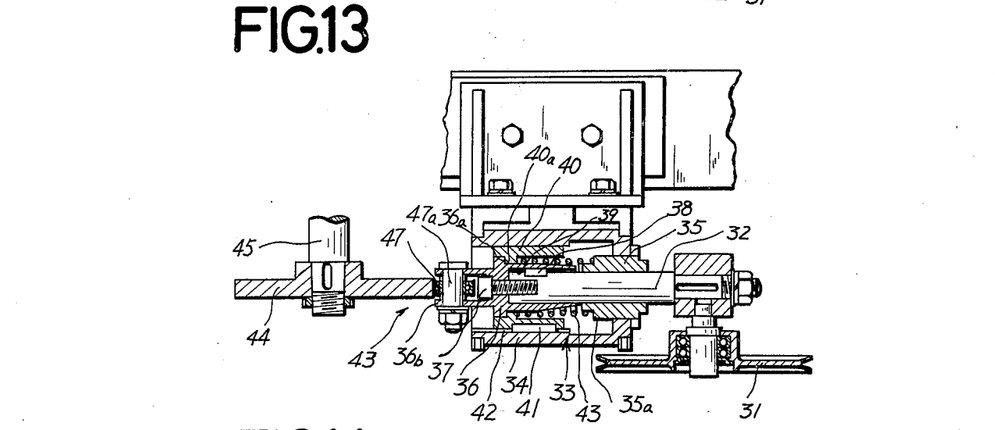
FIG. 13 is an enlarged and horizontally sectional view of a guide assembly for an oscillating roller incorporated in the apparatus as shown in FIG. 10.

The guide assembly 33, which is illustrated in FIG. 13 in more detail, may comprise a housing 34 in which the reciprocating rod 32 is disposed and slidably extends through a bushing 35 mounted on and extending through the housing wall. The reciprocating rod 32 at the other end thereof has an inner sleeve 36 fitted and secured thereto by a screw 37. The rod 32 may be provided adjacent to the other end thereof and on the outer periphery thereof with a key 38 received in a longitudinal key way 39 in the inner periphery of the sleeve 36 to assure to prevent the rod from rotating relative to the sleeve. Around and on the inner sleeve 32 is disposed an outer sleeve 40 which in turn slidably engages the housing 34 at the inner surface thereof. The outer sleeve 40 may have a shoulder 40a engaging a corresponding shoulder 36a provided on the inner sleeve 36. A key 41, which is provided on the outer periphery of the sleeve 40, is received in a longitudinal key way 42 provided in the inner periphery of the housing 34 to assure to prevent the outer sleeve 40 from rotating relative to the housing. The inner and outer sleeves 36 and 40 may be preferably secured to one another as by welding. Around the inner sleeve 36 is disposed a coil spring 43, one end of which engages a shoulder 35a integral with the bushing 35 and the other end of which engages the shoulder 40a of the outer sleeve 40, so that the inner and outer sleeves 36 and 40 together with the reciprocating rod 32 are urged in a leftward direction as viewed in FIG. 13.

In order to effect the reciprocation of the oscillating pulley 31 along the longitudinal axis of the rod 32, there is provided with cam means comprising cam 44 removably mounted on a cam shaft 45 which is in turn supported by a pair of bearings 46 and 46' at the top of the frame assembly 9 (see FIG. 12) and a cam follower 47 pressed against the cam 44. The cam follower 47 may be preferably in the form of a bearing race rotatably mounted on a shaft 27a as shown in FIG. 13, which is in turn securely mounted on an extension 36b of the inner sleeve 36 extending from the housing 34. Thus, rotation of the cam 44 about the axis of the cam shaft 45 causes the cam follower 47 to reciprocatively move on the periphery of the cam 44 along the longitudinal axis of the rod 32 with the result that the oscillating pulley 31 accordingly moves so that the feeding velocity of the wire member 2 is modulated. It will be appreciated that the profile of the cam 44 determines the wave form, maximum and minimum values of the feeding velocity of the wire member 2 while the r.p.m. of the cam 44 determines the variation pitch or cycle of the feeding velocity. Therefore, it will be understood that the velocity characteristic as desired can be accomplished by properly replacing the cam 44 for another specific one.

Referring again to FIGS. 10 and 11, a second reduction gear 48 is mounted on the base of the frame assembly 9 and includes on one of the sides thereof an input shaft 49 having a pulley 50 secured thereto and on the other side an output shaft 51 having a pulley 52 secured thereto. An endless belt 53 engagingly passes between the pulley 22 on the first reduction gear 20 at the other groove 22b thereof and the pulley 50 on the second reduction gear 48 so that the input shaft 49 of the reduction gear 48 is driven by the motor 18 through the pulley 22 on the first reduction gear 20. A third reduction gear 54 is mounted on the base 9a of the frame assembly 9 and includes on one of the sides thereof an input shaft 55 having a pulley 56 secured thereto and on the other side an output shaft 57 having a pulley 58 secured thereto. An endless belt 157 engagingly passes between the pulleys 52 and 56 so that the third reduction gear 54 is driven by the second reduction gear 48.

Referring again to FIG. 12, on the top of the frame assembly 9 is provided a fourth reduction gear 59 including an input shaft 60 in a common vertical plane to the output pulley 58 with a pulley 61 secured to the shaft 60 and opposite the input shaft an output shaft 62 having a pulley 63 secured thereto. An endless belt 64 engagingly passes between the output pulley 58 on the third reduction gear 54 and the input pulley 61 on the fourth reduction gear 59 so that the fourth reduction gear 59 is driven by the output of the third reduction gear 54. On the cam shaft 45 of cam means is securedly mounted on a common plane to the output pulley 63 on the fourth reduction gear 59 a pulley 164 which has an endless belt 65 on one of the sides thereof engaging therewith and the belt 65 on the other side engages with the pulley 63 on the fourth reduction gear so that the cam 44 can be driven by the fourth reduction gear 59.

It should be noted that a plurality of reduction gears 20, 48, 54 and 59 aid in ranging wide variable ratios of speed of the cam 44 and therefore, making variation pitch or cycle of feeding the wire member 2 variable in multiple steps.

Figure 11:
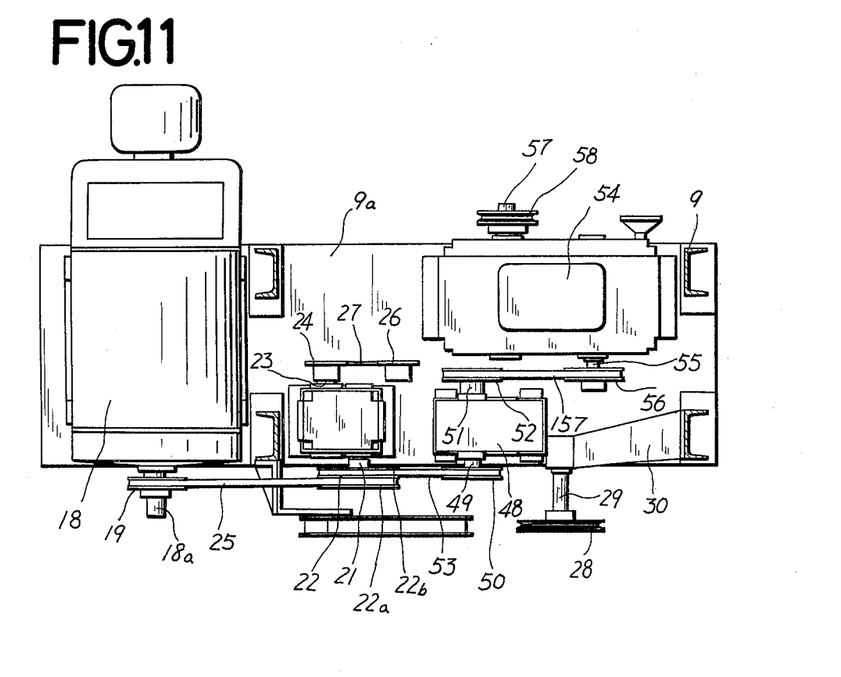
FIG. 11 is a top view of feeding means taken along line 11—11 of FIG. 10.
Figure 12:
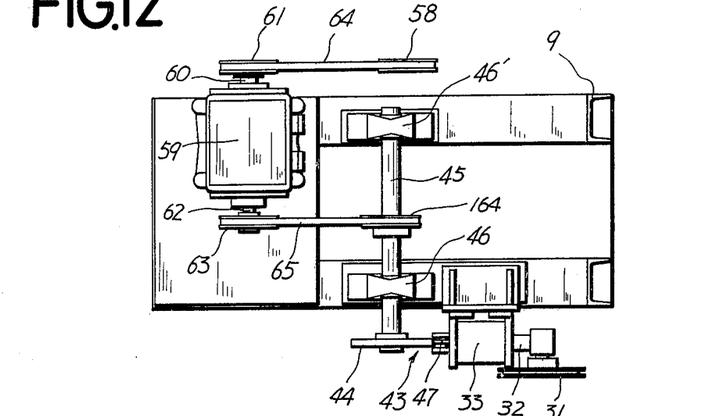
FIG. 12 is a top view of portion above that as shown in FIG. 11.
Figure 14:
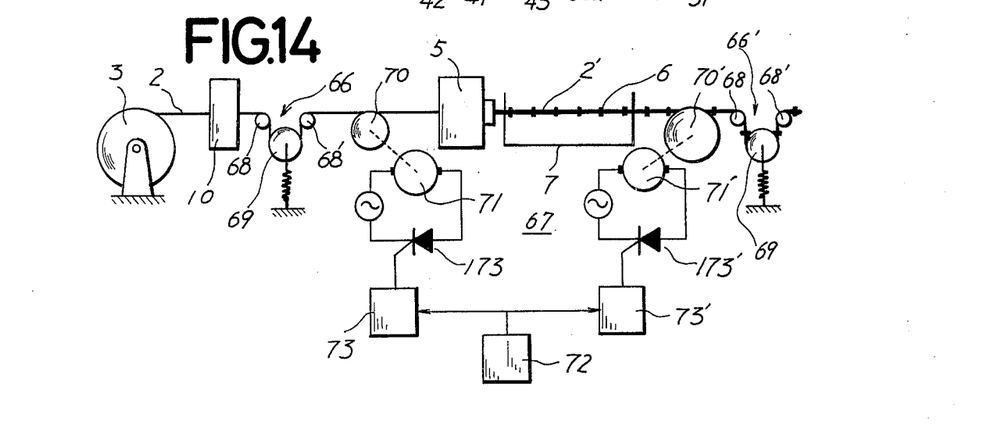
FIG. 14 is a schematic diagram of a system including an alternative embodiment of the pulsatingly feeding means.

Referring now to FIG. 14, there is shown a schematic diagram of the extruding system in accordance with the present invention wherein another embodiment of pulsatingly feeding means is provided to be suitable for practising the present method, and in which the same reference numerals designate the same components as those of FIGS. 1, 10 and 11. The wire member 2 passes through the constant feeder 10 as shown in FIGS. 10 and 11 and then through a shock absorber 66 into an electric velocity modulator 67 which will be described hereinbelow. The covered wire member 2', after leaving the modulator 67 may pass through another shock absorber 66'. The shock absorbers 66 and 66' may each in the form of a conventional accumulator comprising a plurality of guide rolls 68 and 68' and a dancer roll 69, around which the wire member 2 and the covered member 2' engagingly pass, as shown in this figure. The electric velocity modulator 67 comprises capstans 70 and 70' disposed on the input and output sides of the extruder 5, respectively, for frictional engagement of the wire member 2 and 2' therewith and low inertia motors 71 and 71' to drive the respective capstans 70 and 70'. Frictional engagements of the wire member 2 with the capstan 70 and of the covered wire member 2' with the capstan 70' are effected by winding the members 2 and 2' around the respective capstans and as a result the members run responsive to revolutions of the capstans. The covered wire member 2' may be preferably wound around the capstan 70' after its solidifcation through the cooling trough 7. The low inertia motors 71 and 71' may comprise those commercially available under trademark "MINERTIA MOTOR" and manufactured by The Yasukawa Electric Co., Ltd. of Fukuoka-Prefecture, Japan, which is a D.C. motor the speed of which is controlled by an applied voltage. The low inertia motors 71 and 71' are so controlled by a common oscillator 72 that both motors are synchronized in their speeds. More particularly, signal from the oscillator 72 is amplified by amplifiers 73 and 73' to apply it to respective controlled rectifiers 173 and 173', such as thyristors for example to control the D.C. voltages applied across the motors 71 and 71'. The amplitude, wave form and cycle of the D.C. voltages across the motors 71 and 71' may be determined as desired by output wave form from the oscillator 72. One of the features of the embodiment shown in FIG. 14 is that because of modulating means disposed on both the input and output sides of the extruder 5 the wire members 2 and 2' are more precisely fed in accordance with this embodiment than in cases wherein the modulator 11 is disposed only on the input side of the extruder, with the result that portion of the wire member between the input and output sides of the extruder has no variation in tension.

Referring now to FIGS. 15 to 23, there are illustrated some extruder dies in their outlet profiles suitable for practice of the method in accordance with the present invention. Considering application of an extruded covering on an elongated core member according to the present invention in view of rheology, while the core member has been fed through the extruder at predetermined and constant forward velocity in a conventional manner, flow of thermoplastic material at the outlet of the die has a characteristic wherein drag and pressure flows of thermoplastic material are included, because thermoplastic material is dragged with material attached to the core member, but either during decelerating forward movement of the core member, during reversely moving the same or during stopping movement of the same, flow of thermoplastic material presents a characteristic wherein only pressure flow is included. The covering extruded on the core member with drag flow of thermoplastic material has no trouble since no variation occurs in the outer diameter and also in appearance of the covering. However, the covering extruded with pressure flow of thermoplastic material has variation in appearance due to various distal effects applied on material within the die. The distal effects generally include melt fracture and Barus effects. The former is that appearance of the covering on the core member becomes irregular due to variation in flow of thermoplastic material caused by shear stress from the extruder die wall and the latter is that irregular appearance occurs in the covering because during passage of material through the flow path therefor it tends to be subject to various shear strain which is accumulated as inner energy and then restored or relieved at the die outlet to expand material to be attached to the core member. The covering and more particularly the outward extensions thereof, subject to such distal effects, result to be considerably deformed in appearance to provide no desired configuration to the covering. This tendency increases as shear rate becomes larger and as a result considerable variation occurs in appearance of the covering. The inventors have discovered that provision of desiredly shaped recess in the extruder die at the front thereof cause the appearance of the covering extruded on the core member with pressure flow of material to be regulated by the configuration of the die outlet, as desired.

Figure 15:
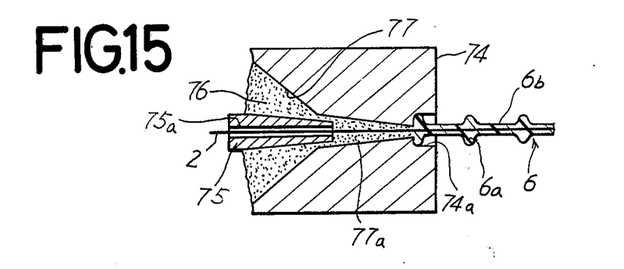
FIG. 15 is a fragmentary and vertically sectional view of a die in an extruder adapted to be employed in the present invention.

Referring now to FIG. 15, there are shown in vertical section an extruder die 74 and a nipple 75 disposed in the die in a coaxial relation thereto, and melted thermoplastic material 76 is fed through a cross head (not shown) by a feeding screw within a barrel (not shown) of the extruder into a passage way 77 defined by the die 74 and the nipple 75 while the wire member 2 passes through a longitudinal bore 75a in the nipple 75 and then through an extruding passage way 77a at the varied velocity by pulsatingly feeding means as afore-mentioned, to thereby attach the covering 6 onto the wire member 2. As already described, normal extruding condition in which the thinner portions 6b of the covering 6 are being formed on the core member is based on flow of material including drag flow, causing no variation in their cross section, but the thicker portions 6a of the covering 6 are generally based on pressure flow of material 76, tending to produce variation in the cross section thereof. A circular recess 74a provided in the die outlet at the front thereof controls variation in the cross section of the covering thicker portions 6a and particularly variation in the surface profile L of the thicker portions 6a facing the supply source or on the leftward side as viewed in FIG. 15. The surface profile R of the thicker portions 6a facing the coiler or on the rightward side of this figure will be determined by the feeding velocity of the wire member 2 on which the covering 6 is applied.

Figure 16:
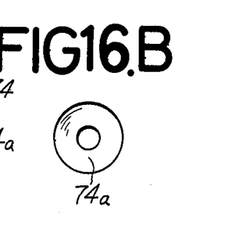
FIG. 16A is an enlarged and vertically sectional view of a portion of the die as shown in FIG. 15.
FIG. 16B is a front view of the outlet of the die as shown in FIG. 16A.
Figure 16A:
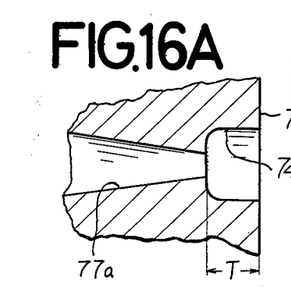
Figure 17A:
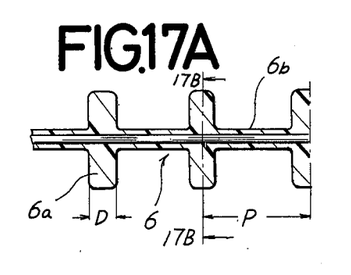
FIG. 17A is an enlarged side elevational view of an elongated core member having a covering extruded through the die as shown in FIG. 16A, with the covering illustrated in vertical section.
Figure 17B:
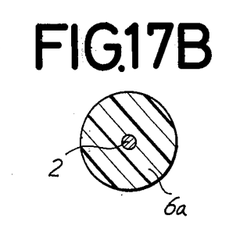
FIG. 17B is a cross-sectional view of the elongated member shown in FIG. 17A taken along line 17B—17B of FIG. 17A.

FIGS. 16A and 16B show the outlet recess 74a in the extruder die 74 in an enlarged manner, which is made to conform to the configuration of the covering thicker portions to be extruded as desired. Thus, the base or bottom face of the outlet recess 74a shown in FIGS. 16A and 16B is seen to be of three dimensional or hemispheric face conforming to the surface profile L of the thicker portions 6a as shown in FIGS. 17A and 17B. The die outlet recess 74a shown in FIG. 16A has a length or depth dependable upon the thickness D and space or pitch P of the desired covering thicker portions 6a and the corelation between them is defined by the formula, $D<T<P$.

Figure 18:
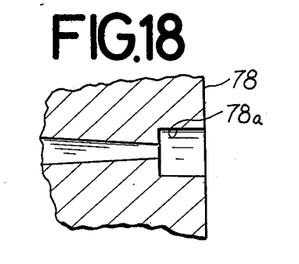
FIG. 18 is similar to FIG. 16A, but illustrating an alternative die.
Figure 19:
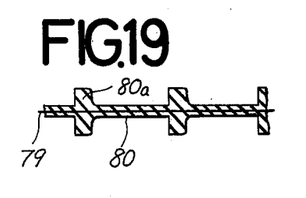
FIG. 19 is an enlarged side elevational view of an elongated core member having a covering extruded through the die as shown in FIG. 18, with the covering illustrated in vertical section.

A die 78 shown in FIG. 18 has an outlet recess 78a adapted to extrude a covering 80 having a disk-like insulation 80a of thermoplastic resin, on an elongated center or inner conductor 79 of an electric coaxial cable, for example as shown in FIG. 19. It will be understood that since enlarged portions of the covering are disk-shaped the outlet recess has a bottom face of two dimensional circle.

Figure 20:
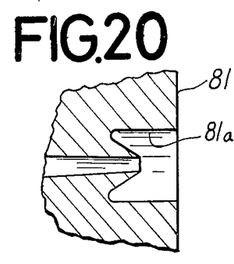
FIG. 20 is substantially similar to FIGS. 16A and 18, but illustrating a modified die of an extruder.
Figure 21:
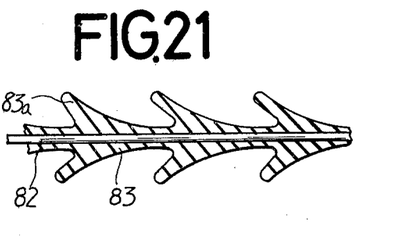
FIG. 21 is an enlarged side elevational view of an elongated core member having a covering extruded through the die as shown in FIG. 20, with the covering in vertical section.

An extruder die 81 shown in FIG. 20 has an outlet recess 81a the bottom face of which is generally of circular cone. Such die is adapted to make on a wire member 82 an extruded covering 83 including an enlarged portions 83a of a particular profile as shown in FIG. 21. The covering 83 shown in FIG. 21 is also adapted to be used as an insulator of a coaxial cable in the same manner as described in connection with the afore-mentioned embodiments.

Figure 22:
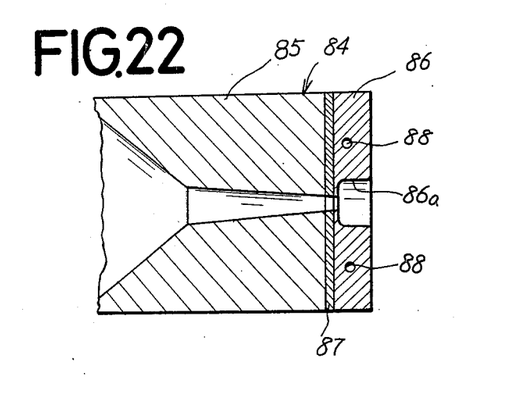
FIG. 22 is an enlarged and vertically sectional view of a further modified extruder die.
Figure 23A:
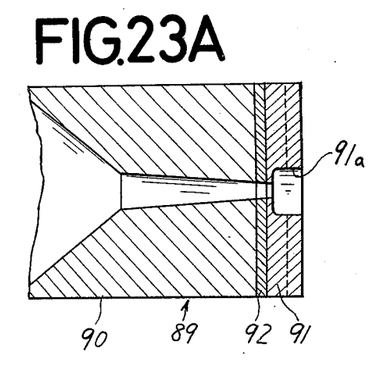
FIG. 23A is an enlarged and vertically sectional view of a further modified extruder die.
Figure 23B:
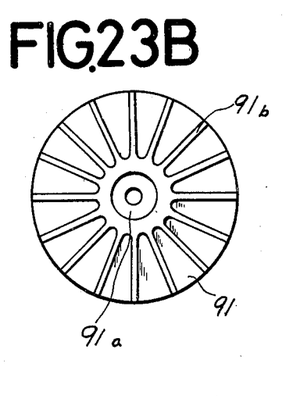
FIG. 23B is a front view of the die shown in FIG. 23A.

Referring now to FIG. 22, an extruder die 84 has a die body 85 with a front or outlet portion 86 including an outlet recess 86a similar to that of the embodiment afore-said in connection with FIGS. 15 and 16, separated and thermally insulated from the die body 85 by means of thermal insulator, such as mica plates 87 inserted between the die body 85 and the front portion 86 and secured thereto by any suitable means, so that high temperature from the extruder is prevented from being transported to the front portion 86 of the die 81. After melted material has been attached to the core member and then molded conforming to recess 86a in the die outlet because of the core member reduced in feeding velocity, stopping or moved in backward direction, the covering of melted material on the core member can be easily relieved from the recess wall of the die outlet. In the illustrated embodiment, the front portion 86 of the extruder die is found to be provided with a path 88 extending therethrough and through which a cooling water is recirculated for promotion of cooling the front portion 86. An extruder die 89 shown in FIGS. 23A and 23B has a die body 90 with a front or outlet portion 91 including a recess 91a similar to that of FIG. 22, separated and thermally insulated from the die body 90 by means of a thermal insulator 92 in the same manner as described in connection with the extruder die 84 of FIG. 22, but the front portion 91 is provided with a plurality of radial fins 91b by which the cooling water path 88 of FIG. 22 is replaced, for cooling the front portion 91. It will be understood that the covering molded by the recess 91a can be easily relieved from the recess wall in the same manner as afore-described. Although the extruder dice 84 and 89 of FIGS. 22, 23A and 23B are shown to have the substantial same profile as that of FIGS. 16A and 16B, it will be understood that they may have any other profiles.

Figure 24:
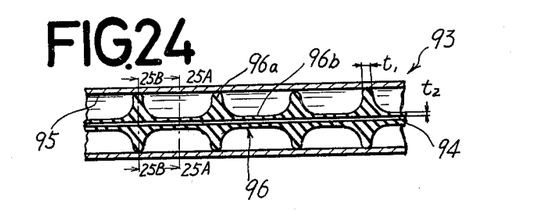
FIG. 24 is a fragmentary and enlarged view of a coaxial cable having an inner conductor covered with an insulation extruded in accordance with the present invention.
Figures 25A, 25B, 26:
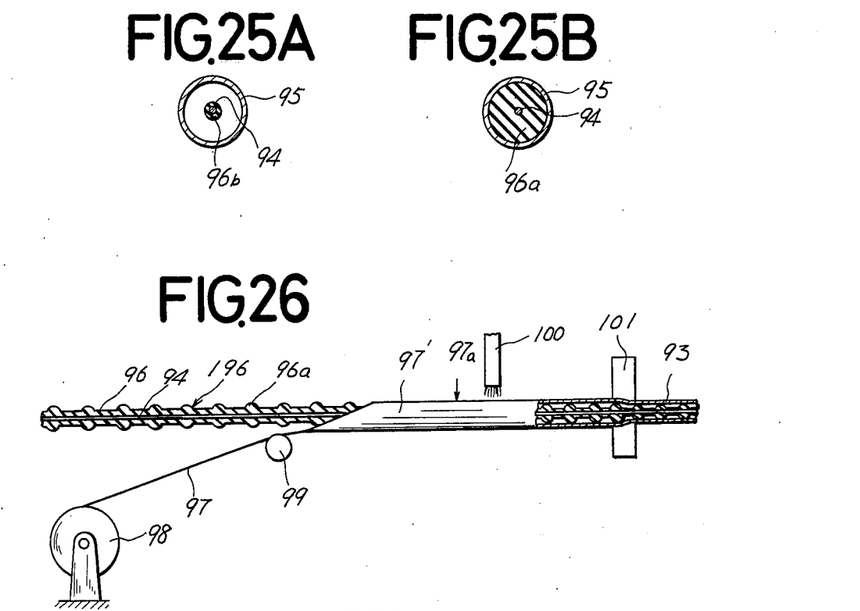
FIG. 25A is a cross sectional view of the coaxial cable of FIG. 24 taken in line 25A—25A of FIG. 24.
FIG. 25B is a cross sectional view of the coaxial cable of FIG. 24 taken in line 25B—25B of FIG. 24.
FIG. 26 is a schematic diagram illustrating a strip of an outer conductor formed into a cylinder around an inner conductor covered with an insulation for manufacture of a coaxial cable and further illustrating the tubular outer conductor reduced in diameter and thermally bonded to the outer edges of the insulator on the inner conductor, with portions in vertical section for purpose of its illustration.

Referring now to FIGS. 24 and 25, an electric coaxial cable is generally indicated by numeral 93 and comprises a wire-like center or inner conductor 94 which may be formed of aluminium or copper and a tubular outer conductor 95 coaxially disposed around the inner conductor and which may be also formed of aluminium or copper. On the inner conductor 94 is mounted an insulation 96 adapted to insulate the inner conductor 94 from the outer conductor 95 and also to position them in a coaxial relation to each other. The insulation 96 may be formed by being extruded on the inner conductor 94 as a core member in the same manner as described in the aforesaid embodiments. It should be noted that the coaxial cable 93 has the insulation 96 applied on the inner conductor 95 overall the entire length thereof, which is essentially different from a conventional type of coaxial cable having a disk-like insulator between the inner and outer conductors, and therefore deformation of the outer conductor 95 will not cause it to electrically contact with the inner conductor 94. The insulation 96 has a plurality of spaced and alternate thinner portions 96b formed during higher velocity of the inner conductor 94 through the extruder and a plurality of alternate thicker portions 96a formed during negative velocity of the inner conductor 94 through the extruder. Such insulated inner conductor, referred to hereinafter as an insulated core, is desired to be formed so that the portions 96b of the insulation 96 may be as thinner as possible and that the disk portions 96a may have a steep contour and be sufficiently larger in the diameter than that of the inner conductor 94. Accordingly, the inner conductor may be preferably fed through the extruder in accordance with the characteristic in which intermittent backward movements of the conductor are included as shown in FIG. 6 and 8. Among others, the characteristic shown in FIG. 8 is suitable for manufacture of the insulated core for the coaxial cable.

The disk portions 96a of the insulation 96, having a plane substantially perpendicular to the axis of the inner conductor 94 and an outer diameter substantially equal to the inner diameter of the outer conductor 95, have the maximum thickness $t_1$ enough to maintain their mechanical and electrical strengths. The thinner portions 96b of the insulation 96, which are necessary only for prevention of short-circuiting the inner and outer conductors, have the thickness $t_2$ considerably smaller than the thickness $t_1$ of the portions 96a. Preferably, the ratio of the thickness $t_2$ relative to the thickness $t_1$ may range between ½ and 1/20. Thus, the thinner portions 96b of the insulation advantageously improves the flexibility of the coaxial cable 93 and facilitates removal of the insulator 96, whicch will be required when the coaxial cables are intended to be connected to each other.

Referring to FIG. 26, there is schematically shown a system suitable for forming an outer conductor for the co-axial cable 93 shown in FIG. 24, wherein the insulated core 196 including the insulation 96 applied on the inner conductor 94 as described hereinabove is fed in the direction indicated by an arrow, along which strip or tape 97 of either copper or aluminium from a supply 98 is fed through a guide roll 99 into a forming apparatus (not shown) in which the strip 97 is rolled up around the insulated core 196 into a cylindrical body 97', the abutting edges 97a of which may be welded as by a TIG welding torch 100 or the like. It should be noted that the cylindrical body 97' has somewhat larger inner diameter than the outer diameter of the disk portions 96a of the insulation 96 so that both can be spaced from each other. Thereafter, the cylindrical body 97' is reduced in diameter through a shrinking device 101, such as a drawing die, for example to be thereby jointed to the disk edges of the insulation 96. Preferably, a heater assembly (not shown), which may be of any conventional form, may be provided in the shrinking device for heating the cylindrical body 97' during its reduction in diameter to thermally bond the inner periphery of the body to the edges of the disk portions 96a. This advantageously prevents water entering the cable through the pinhole, etc. in the outer conductor from running longitudinally between the insulation 96 and the outer conductor 95. In order to improve thermally bonding of the outer conductor 95 to the disk portions 96a, it is desirable to use ethylenic copolymer as thermoplastic material of which the insulation 96 is formed.

Figures 27, 28:
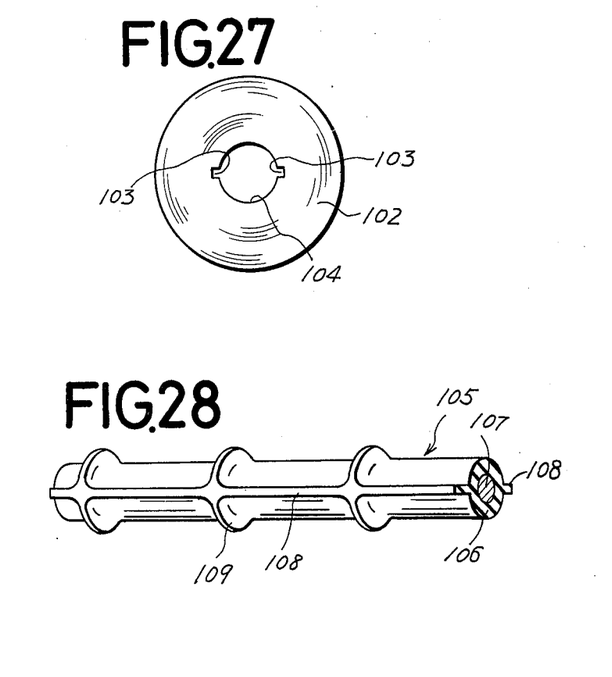
FIG. 27 is an enlarged front view of an extruder die employed for manufacturing an electric wire free from growth of snow collecting thereon.
FIG. 28 is a fragmentary perspective view of an insulated core of the electric wire with an insulator extruded through the die as shown in FIG. 27.

Referring then to FIG. 27, there is shown in front view a modified extruder die 102 which is provided with longitudinal grooves 103 in the opening wall 104 of the die 102 on opposite sides thereof. FIG. 28 shows an electric wire 105 comprising core conductor on which thermoplastic material is extruded while the core conductor is fed through the extruder die 102 at pulsatingly varied velocity of the core conductor as described in the afore-mentioned embodiments. The electric wire 105 is seen to have a covering layer 106 on the conductor core 107, including opposing longitudinal ribs 108 formed by the grooves 103 in the die 102 and longitudinally spaced and peripheral ribs 109 formed by feeding the core conductor through the die 102 at pulsatingly varied velocity of the core conductor. With such electric wire installed, when it would have highly humid and weighty snow gathering on it, the longitudinal and peripheral ribs 108 and 109 prevent snow on the cable from moving longitudinally and peripherally and therefore, growing into a larger lump. Therefore, the electric wire will be prevented from its breakage due to collection of snow on it.

While preferred embodiments of the present invention have been described with reference to the accompanying drawings, it would be apparent to those skilled in the art that various changes and modifications might be made from the teachings of the disclosure in the specification without departing from the present invention. By way of examples, the modulator may be of other equivalents electrically or mechanically operated and the arrangement shown in FIG. 14 can be applied on a mechanically variable feeder. Therefore, such modifications will apparently fall within the spirit and scope of the present invention, which is not intended to be limited to the embodiments, except by the appended claims.

What is claimed is:

1. A method for forming on an elongated core member a covering of thermoplastic material with the outer diameter thereof varied along the longitudinal axis of said core member, comprising the step of extruding said thermoplastic material on said core member through an extruder die while said core member is fed at a pulsatingly varied velocity of said core member, characterized by that said core member has a substantially constant average feeding velocity while said thermoplastic material has a substantially constant average volumetric flow rate at which said thermoplastic material is extruded from said extruder die; and that said pulsatingly varied velocity of said core member is established at a point before entry of said core member into said extruder to have a maximum value which is greater than the average flow rate of said thermoplastic material through said extruder die at the outlet thereof and to have a minimum value which is negative, with said maximum and minimum values alternately repeated in a periodical manner whereby said covering varies in the outer diameter thereof along the longitudinal axis of said core member.

2. A method as set forth in claim 1, wherein said pulsatingly varied velocity of said core member is further established at a point after cooling and solidification of said covering on said core member in synchronism with the pulsatingly varied velocity of said core member at the point before entry into said extruder.

3. A method as set forth in claim 1, wherein said extruder die outlet includes a recess provided in said outlet at the front thereof and further comprising the step of controlling the configuration in said covering applied on said core member when said core member is fed at a lower velocity than said average flow rate of said thermoplasitc material through said die at the outlet thereof.

4. A method as set forth in claim 3, wherein said recess in said die outlet is cooled at the wall thereof.

5. A method for producing an insulated core for a coaxial cable, said insulated core including an elongated inner conductor and an insulation having large and small diameter portions alternately and continuously provided on said inner conductor, comprising the step of extruding thermoplastic insulation on said inner conductor through an extruder die while said inner conductor is fed at a pulsatingly varied velocity of said inner conductor, characterized by that said inner conductor has a substantially constant average feeding velocity while said thermoplastic insulation has a substantially constant average volumetric flow rate at which said thermoplastic insulation is extruded from said extruder die; and that said pulsatingly varied velocity of said inner conductor is established at a point before entry of said inner conductor into said extruder to have a maximum value which is greater than the average flow rate of said thermoplastic insulation through said extruder die at the outlet thereof and to have a minimum value which is negative, with said maximum and minimum values alternately repeated in a periodical manner.

6. A method for producing a coaxial cable comprising the steps of rolling up a strip of conducting material over the insulated core formed in accordance with said claim 5 so that the opposite longitudinal edges of said strip abut with each other, welding said abutting edges of said strip into a resultant cylindrical outer conductor, drawing said outer conductor through a die to closely engage said conductor at the inner surface thereof with the large diameter portions of the insulator on the inner conductor of said insulated core and heating said cylindrical outer conductor to thermally bond said outer conductor at the inner surface thereof to said large diameter portions of said insulator.

7. A method for producing an electric wire to inhibit growth of snow thereon, said electric wire including a core conductor and an insulation including a plurality of peripheral ribs spaced longitudinally from each other and at least one longitudinal rib, both of which are provided on said core conductor, comprising the step of extruding thermoplastic insulation on said core conductor through an extruder die while said core conductor is fed at a pulsatingly varied velocity of said core conductor, said extruder die including a longitudinal groove to form said longitudinal rib, characterized by that said core conductor has a substantially constant average feeding velocity while said thermoplastic insulation has a substantially constant average volumetric flow rate at which said thermoplastic insulation is extruded from said extruder die; and that said pulsatingly varied velocity of said core conductor is established at a point before entry of said core conductor into said extruder to have a maximum value which is greated than the average flow rate of said thermoplastic insulation through said extruder die at the outlet thereof and to have a minimum value which is negative, with said maximum and minimum values alternately repeated in a periodical manner whereby said peripheral ribs are formed on said core conductor.

* * * * *